Jan. 8, 1952      G. A. SPENCER      2,581,922
APPARATUS FOR AND METHOD OF FORMING FILAMENTS
Filed Feb. 5, 1947
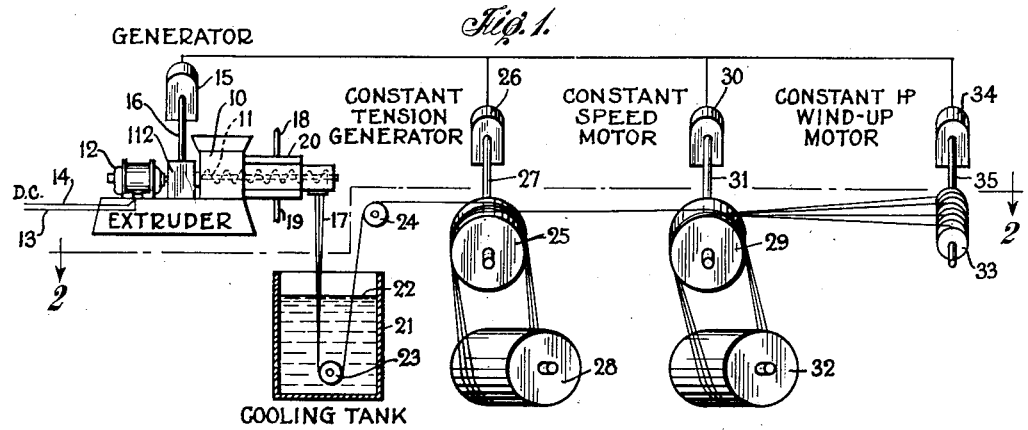
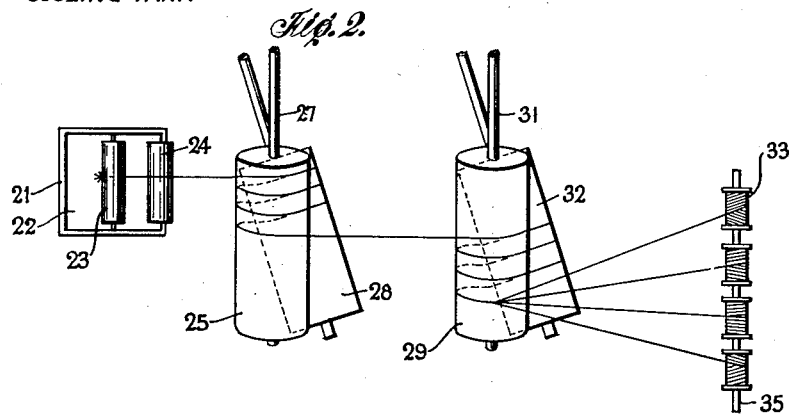
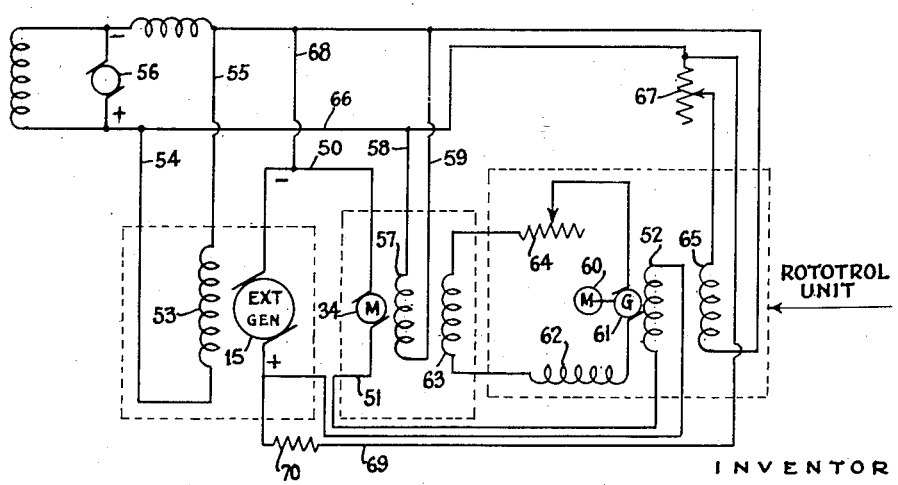
INVENTOR
GEORGE A. SPENCER
BY
ATTORNEYS Patented Jan. 8, 1952

2,581,922

UNITED STATES PATENT OFFICE 2,581,922

APPARATUS FOR AND METHOD OF FORMING FILAMENTS

George A. Spencer, Akron, Ohio, assignor to The Firestone Tire & Rubber Company, Akron, Ohio, a corporation of Ohio Application February 5, 1947, Serial No. 726,486

9 Claims. (Cl. 18—8)

This invention relates to the formation of filaments, especially to the formation of filaments from crystalline, thermoplastic materials by a continuous, uniform forming action.

Heretofore various methods have been proposed to form fine filaments, having a diameter of from about .001" to .015" from crystalline, thermoplastic, filament-forming materials. One standard method of forming such filaments is by heating the thermoplastic material to plasticize same, extruding the material to form hot plastic filaments, and then pulling the filaments from the extrusion machine and processing them to final filament size. Thermoplastic materials of the type specifically referred to by this invention are crystalline materials that can be solidified originally in an amorphous, super-cooled form which they will retain for brief periods, during which the filament should be stretched to crystallize it in an oriented condition wherein the axes of the crystals lie along and are parallel to the longitudinal axis of the filament. Such orienting action of the filament greatly increases its strength, as well as permits it to be formed to a quite small diameter.

Heretofore, such filaments have been formed by passing the filament first over a constant speed roller and then over a second roller governed to provide constant tension in the filament between the rollers. However, the resulting filaments have not had uniform cross-sectional area because of varying physical properties in the material emerging from the extruder, which results in different degrees of elongation at the constant tension provided.

Other filament forming methods have been proposed, but in every instance it has been very difficult, if not impossible, to produce a resultant filament having uniform physical size and physical properties.

The general object of the present invention is to avoid and overcome the difficulties of previous filament forming methods and to provide a filament forming method characterized by the application of a uniform force to the newly formed plastic filaments so that the filaments can be processed with uniform cross-sectional area regardless of their varying physical properties.

Another object of the invention is to provide means for correlating the filament formation rate with the processing rate.

A further object of the invention is to provide a simple, inexpensive method of producing filaments of uniform size.

Another object of the invention is to maintain a uniform tension on a filament as it is formed and processed and to compensate for frictional variations with changes in the processing rate.

The foregoing and other objects and advantages of the invention are achieved, broadly speaking, by the provision of an extrusion device for forming filaments, a constant tension roller device which receives and withdraws the newly formed plastic filaments from the extrusion device, a quench tank for receiving newly formed filaments from the extrusion device prior to their passage to the roller device, a constantly driven uniform speed tensioning roll means for receiving the filaments from the roller device, and wind-up rolls driven by constant horsepower wind-up apparatus to tension the filaments substantially uniformly as they are deposited on storage rolls.

Attention now is directed to the accompanying drawings, wherein:

Fig. 1 diagrammatically shows apparatus embodying the principles of the invention.

Fig. 2 is a plan of the apparatus of Fig. 1 taken on line 2—2 thereof; and

Fig. 3 is a wiring diagram of the apparatus.

Referring specifically to the drawings, a suitable extrusion device 10 adapted to form filaments, includes conventional means, such as an extrusion screw 11, driven by a motor 12. Motor 12 connects to a suitable power source, usually direct current, through leads 13 and 14. Motor 12 is connected to a generator 15 through gear box 112 and a shaft 16 to drive the generator 15 at the same, or at a proportional rotational speed as the means used in driving the extrusion device with the speed of the generator 15 being a measurement or function of the extrusion rate.

Referring to the extrusion device 10, a plurality of small diameter filaments 17 are formed by and constantly issue from such device as it operates. These filaments are extruded from a suitable thermoplastic material of the type described hereinafter in more detail, and the filaments are in hot, plastic condition as they issue from the device 10. Normally suitable heating means, such as pipes 18 and 19 connect to a jacket 20 associated with the extrusion device 10 to circulate a heating medium in the jacket and heat the thermoplastic material therein to a plastic condition.

To cool the newly formed filaments 17 in an amorphous condition, a tank 21 is positioned immediately adjacent the extrusion device 10 containing coolant 22, such as water, retained at a temperature of from about 55° F. on down to about 34° F., dependent upon the specific size of the filaments formed and their composition, to solidify the material forming the filaments 17 in amorphous condition. A guide roll 23 is conventionally positioned in the lower portion of the cooling tank 21 and filaments 17 pass over such guide roll in their movement through the tank. A second guide roll 24 is positioned adjacent to and above the cooling tank, the filaments being led over such roll 24 in their passage from the tank.

As an important feature of the invention, a pull-off roll 25, which drives a constant tension device, such as a direct current constant drag generator 26, is provided for initially receiving the filaments 17 from the cooling tank 21. A shaft 27 connects the generator 26 to the roll 25. Thus the roll can draw or pull the filaments 17 from the extrusion device 10, although gravity may be used to facilitate flow of the filaments from the extrusion device which normally is positioned in such manner that the filaments or threads 17 move vertically downwardly as they issue. Roll 25 pulls the filaments from the tank 21. Preferably, filaments 17 pass around a roll 28 associated with the roll 25 with several loops of the filaments 17 around rolls 25 and 28 prior to being processed to their final reduced diameter and oriented forms. Figs. 1 and 2 show that the roll 25 may be inclined downwardly at a slight vertical angle with relation to the roll 28 and that roll 28 may be placed at an angle to the roll 25 in relation to the direction of movement of the filaments as they are fed to the roll 25 in order to have the filaments 17 engage the rolls and to move through a predetermined path. Roll 28 is usually suitably coupled to and driven by the roll 25.

From the constant tension take-off roll 25, the filaments 17 are uniformly processed and stretched as they are drawn by a roll 29 from which the filaments may pass through conventional level winding means to wind-up means. Roll 29 is driven at a constant speed by means, such as a constant speed D. C. motor 30, which connects to the roll 29 by a shaft 31 and which usually comprises a shunt wound motor. Both the armature of the motor 30, and the armature of the generator 26, are connected in parallel with the armature of the generator 15. Motor 30 operates at a constant speed for a constant voltage and its speed varies proportionately to the voltage applied. The constant speed roll 29 is adapted to move at a peripheral speed of about 350 per cent of the speed of the take-off roll 25, since it has been found that the filaments 17 and the material comprising same usually develop the best physical condition and properties at the resulting degree of tension. The speed of rotation of the roll 25 is retained in substantially a fixed percentage relationship with the speed of the roll 29 due to the motor 30 responding directly to the voltage output of the generator 15 while the speed of generator 26 is controlled by the generator 15 so long as no changes in tension of the filament occur. When the tension on the filaments 17 varies appreciably, adjustments in the speed of generator 26 and a windup motor 34 are made by means of field control of generator 26 and motor 34, one example of such a control being hereinafter described in detail. The motor 30 is built in a manner to enable it to self-compensate for its frictional losses with increased speed. A tensioning roll 32 is associated with and usually suitably driven by roll 29. The filaments are looped around associated rolls 29 and 32 several times to insure that the filaments are formed to the desired physical condition before they are released for passage to windup reels. It will be seen that the rolls 29 and 32 are positioned in a manner similar to the rolls 25 and 28 for axial movement of the filaments along the rolls progressively from one end thereof. To handle and store the filaments 17, a plurality of reels 33 are provided to receive the filaments 17 from the roll 29. The reels 33 are driven by the constant horsepower windup motor 34, shown diagrammatically as being engaged with the reels 33 through a shaft 35 with the reels adapted to place a substantially uniform tension on filaments 17 as they move from the constant speed roll 29 to the windup reels 33. As the diameter of the reels 33 varies with the amount of thread or filament wrapped therearound, the drive means for the shaft 35 reduces its rotational speed to exert a constant force on the filaments deposited on the reels 33.

With a system as shown, wherein a constant-tension means precedes a constant speed means, the filament is processed in a condition of both constant tension and constant cross-sectional area. In prior art devices these two conditions could not be attained simultaneously. Their attainment is possible in the apparatus of this invention because variations in the percentage elongation at which any given part of the filament reaches the prescribed and controlled tension result in a variation of linear speed of roller 25, which change in speed is passed on to the highly liquid filament emerging from the extruder. As a result, the emerging plastic is drawn out to a different degree, without any change being imparted to its physical properties. As a consequence of this, the cross-sectional area of filament reaching roller 25 is changed so that, irrespective of the percentage elongation imparted to the filament by the constant tension, the cross-sectional area to which it is reduced between rollers 25 and 29 remains the same at all times.

The foregoing assumes constant rate of output of the extruder and is concerned only with changes in the physical properties of the material being extruded. Changes in the rate of extrusion present a separate problem and, in the apparatus shown, this separate problem is dealt with by connecting the two motors and the drag generator with the generator connected to the extruder.

Referring to Fig. 3 it is seen that the generator 15, associated with the extrusion or tubing device 10, is connected electrically to a motor 34 to drive the wind-up reels 33. This connection is made through leads 50 and 51, with the lead 51 having a cumulative field 52 connected therein. The purpose of the field 52 will be explained hereinafter in detail. The generator 15, in turn, has a field 53 which is connected by leads 54 and 55 to a suitable source of constant electrical potential, such as a field exciting generator 56. The motor 34 is provided with a field 57, which likewise is connected to the exciting generator 56 by leads 58 and 59. A conventional control unit for the motor 34 is provided to effect filament tension control at a pre-determined fixed value with the diameters of the rolls 33 constantly and gradually increasing, which otherwise would tend to increase the tension of the filaments. The forementioned control unit may comprise equipment sold by the Westinghouse Electric Corporation under the trade-name "Rototrol." This unit includes a motor 60 to drive a generator 61 connected through a series field 62 of the generator 61 to a secondary field 63 used as a booster, or control field for the motor 34. A variable resistance 64 is provided in the circuit of the generator 61 to aid in initially adjusting the apparatus. Generator 61 is controlled by a differential pattern field 65 associated with and opposed to the cumulative field 52 in the circuit of the motor 34. Normally the electromagnetic field set up by the combined action of the cumulative field 52 and the differential pattern field 65 will be zero due to their design and arrangement for a given normal condition. The current drawn by the motor 34 tends gradually to increase due to the increasing diameter of the spools 33 with a resulting increase in tension on the filaments 17. Some noticeable increase in motor current and in the tension of the filaments must occur before the speed of the motor 34 would decrease to retain its substantially constant horsepower output. That is, the peripheries of the spools 33, as they are gradually built up, soon move at a slightly greater speed than the rate of movement of the filaments from the rolls 29 and 32 with the filaments 17 tensioned an additional amount as they are deposited on spools 33. Motor 34 will not adjust its speed immediately since it requires a reasonable increase in motor current prior to correcting its speed to return it to a substantially constant horsepower output. While the tension on the various filaments 17 as they approach the spools 33 may sometimes vary slightly, such variations are minor and the filaments are wound up under at least substantially uniform tension, as are the various longitudinal sections of any given filament. Any actual increase effected in the current in the motor 34 will throw the fields 52 and 55 out of balance, with the field 52 increasing in value at such time proportionally to the increased tension of the filament. Such increased field 52 for the generator 61 then causes an increased output for the generator 61 and a resultant increase in the field 63 that is associated with the motor 34 whereupon the change in the resultant electromagnetic field as caused by the field 63 effects a decrease in speed of the motor 34 directly proportional to the increased tension of the filament. Hence, the tension set up by the motor 34 is reduced to its normal value.

The speed control circuit just described is conventional and serves as a sensing means which operates in response to increasing drag between roller 29 and reel 33, due to build-up on the latter, to slow down motor 34 by degrees. A similar control is provided for generator 26 to "sense" speed changes in roller 25 due to changes in the elongation of the filament at the prescribed tension, to permit speeding up or slowing down of the generator while maintaining the constant tension. These sensing means need not necessarily be associated with a hookup as shown, wherein the motor 34 and generator 26 are connected to extruder generator 15. As stated above, this arrangement takes care of variations in extruder output. Either motor 34 or generator 26 could be connected to an independent voltage source and the same is true of motor 30.

While the means driving the roll 25 is termed a generator, this term is used because the filaments 17 normally are pulled by the roll 29 to drive the rolls 25 and 28 and transfer a small amount of energy to the generator 26, but the generator 26 may draw power from its electrical circuit and function as a motor, when required. For instance, in threading the filament around the rolls at the start of a run, the filament is much too weak to turn roll 25 against the drag of generator 26 and, therefore, the latter must be driven.

Another special feature of the present invention is that of compensating for frictional losses as the extrusion rate varies. In other words, the frictional losses in the take-off rolls 25 and 28 will vary directly in proportion with the speed at which they are driven, and unless some compensating means is provided for varying frictional loss, the constant tensional force set up by the generator 26 will not exert a strictly constant tension on filaments 17. As filaments 17 require only very small or light forces for their processing, the friction of the apparatus is a very appreciable part of such filament processing force required. Hence changes in extrusion speed with resultant processing speed changes vary the frictional losses in the system to effect unbalance in opposition to action by the "Rototrol" to keep the system in speed balance.

To keep the system in better balance with varying friction losses, and as a salient feature of the invention, the pattern field 65 is biased with the voltage of generator 15 so as to obtain a direct effect for compensating for the variations in friction losses with speed variations. Thus a lead 66 connects the positive side of generator 56 to a variable resistance 67 connected to the pattern field 65 and a lead 68 connects the negative sides of the generators 56 and 15 together. A lead 69 connects the positive side of the generator 15 to the positive side of the resistance 67 through a current limiting resistance 70. Thus should the generator 15 be driven at increased speed, the increased voltage produced thereby will set up extra pressure on the pattern field 65 which in turn causes its strength to be increased to more than overcome the field 52. Generator 61 then has a slightly reduced output which decreases field 63 and speeds up the motor 34 (or generator 26) proportionately to the increased frictional losses in the system. Thus the frictional losses are compensated since the Rototrol unit receives and treats such forces as thread tension and corrective action is required to maintain the proper constant tension action on the filaments. A compensating circuit similar to that described for the motor 34 is, of course, provided for the generator 26.

The process and apparatus of the invention are applicable to various types of synthetic filament-forming material, such as polymers of vinylidene chloride, and 2,3-dichlorobutadiene-1,3, that are resinous, crystalline and orientable. The invention also may be used with copolymers of relatively large quantities of dichlorobutadiene or vinylidene chloride with minor proportions of other unsaturated compounds such as the vinyl esters on the order of vinyl chloride, vinyl bromide, vinyl acetate, vinyl butyrate, vinyl stearate and the like; vinyl ethers and ketones, such as vinyl isobutyl ether and vinyl ethyl ketone; vinylidene chloride (for dichlorobutadiene); cyclic substituted unsaturated compounds such as styrene, indene, coumarone and the like; conjugated unsaturated compounds such as acrylonitrile, and the like. Dichlorobutadiene should be polymerized in the presence of modifiers such as 1 or 2% of amylmercaptan to avoid obtaining an insoluble and infusible product.

In accordance with the patent statutes, one complete embodiment of the invention has been described herein in detail. However, it will be understood that the scope of the invention is not limited to that example given herein, but that modification may be resorted to within the scope of the appended claims.

It will be seen that the types, sizes, operating conditions, etc., for the various motors and generators used in practice of the invention are calculated and correlated to give the desired speed and control relationship for the lowest average speed at which they will be operated. The friction compensating action of the generator 15 through the pattern field 65 is designed to function for all higher speeds of the apparatus than that lowest average speed selected.

What is claimed is:

1. A device of the character described, having in combination, a power-driven extruder for producing continuously extruded material, a generator operatively associated with said extruder and driven simultaneously with said extruder to generate a voltage proportional to the rate of extrusion, means for applying tension to said continuously moving extruded material comprising a first rotatable member adapted to receive said material from the extruder and a second rotatable member adapted to receive said material from said first member, a motor energized by said generator to drive said second member at a speed greater than and proportional to the rate of extrusion, and a drag motor connected with said first member to limit the speed of rotation thereof to a speed substantially less than the speed of said second member to establish a differential in the speed of said members and to impart tension to said material.

2. Apparatus for conditioning plastic filaments comprising an extruder, tensioning means comprising a first roller adapted to receive extruded filament, means to drive said first roller at constant speed, a second roller between said extruder and said first roller, and drag means operatively connected with said second roller and adapted to impart a constant tension of substantial magnitude on said filament between said second roller and said first roller.

3. Apparatus for conditioning plastic filaments comprising an extruder, tensioning means comprising a first roller adapted to receive the filament, means to drive said first roller at constant speed, a second roller between said extruder and said first roller also adapted to receive said filament, an electric generator connected to said second roller to be driven thereby, and sensing means associated with said generator, responsive to variations in the speed imparted to said second roller by said first roller due to variations in the stiffness of said filament, to vary the drag of said generator whereby constant tension is maintained in said filament between said rollers at all relative speeds of said rollers, and constant cross-sectional area of said filament between said rollers is also maintained.

4. The method of conditioning extruded plastic filament which comprises passing the filament in plural loops over a first roller, thence in plural loops over a second roller, operating said second roller at constant speed, and applying a substantial drag of constant magnitude to said first roller to elongate the filament moving between said rollers, whereby in response to changes in stiffness of the material of said filament moving between said first and second rollers, the speed of said first roller will vary and, as a consequence thereof, the highly ductile filament, as extruded, will be drawn to said first roller at varying speeds and will therefore be elongated, without change in its highly fluid condition, to a degree providing a cross-sectional area of the portion of said filament moving onto said first roller, bearing a ratio to the cross-sectional area of the portion of said filament moving onto said second roller which is at all times equal to the inverse of the ratio of the speeds of the portions of said filament moving onto the respective said rollers, said filament thereby moving onto said second roller in a state of both constant tensioning and constant cross-section.

5. Apparatus for conditioning plastic filaments comprising an extruder, tensioning means comprising a first roller receiving the filament, means to drive said first roller at constant speed, a second roller between said extruder and said first roller, means operatively connected with said second roller and adapted to impart a constant tension to said filament between said second roller and said first roller, a wind-up reel arranged in following sequence to said first roller, and a constant horsepower motor connected in driving relation to said wind-up reel.

6. Apparatus for conditioning plastic filaments comprising an extruder, tensioning means comprising a first roller adapted to receive the filament, means to drive said first roller at constant speed, a second roller between said extruder and said first roller also adapted to receive said filament, an electric generator connected to said second roller to be driven thereby, sensing means associated with said generator, responsive to variations in the speed imparted to said second roller by said first roller due to variations in the stiffness of said filament, to vary the drag of said generator whereby constant tension is maintained in said filament between said rollers at all relative speeds of said rollers, and constant cross-sectional area of said filament between said rollers is also maintained, a second generator connected to said extruder and providing a voltage proportional to the output of said extruder, said means to drive said first roller comprising a motor driven by said second generator, and the first-mentioned generator being electrically connected to said second generator, whereby both the speed of said motor and the drag of the first-mentioned generator are responsive to fluctuations in the output of said extruder to maintain at constant value the volume flow of filament in unit time throughout all points of the apparatus.

7. Apparatus for conditioning plastic filaments comprising an extruder, tensioning means comprising a first roller adapted to receive the filament, a second roller between said extruder and said first roller also adapted to receive said filament, a wind-up reel following said first roller, a first electric generator connected to said extruder and providing a voltage proportional to the output of said extruder, a first motor connected to said first roller and driven by said generator, a second motor connected to said reel and driven by said generator, sensing means in said second motor adapted to vary the speed thereof in inverse proportion to the rate of build-up of filament on said reel, a second electric generator connected to said second roller and having electrical connection with said first generator, and sensing means associated with said second generator for varying the drag thereof in response to changes in linear speed of said second roller.

8. The method of stretching a plastic filament which comprises delivering a formed filament, in deformable condition to a first point at a substantially constant rate of volume in unit time, but subject to variations in linear rate of delivery, driving the filament at a second point at a constant linear rate sufficiently in excess of the linear rate of delivery to said first point to stretch the filament to a predetermined orientation, and restraining the movement of the filament, between said first and second points by means of a force of constant value of the magnitude required to produce the necessary tension in the filament for said predetermined orientation, whereby a filament is produced having a uniformly orientated crystalline structure and a cross-sectional area of constant value.

9. The method of stretching a plastic filament which comprises delivering a formed filament, in deformable condition to a first point at a substantially constant rate of volume in unit time, but subject to variations in linear rate of delivery, driving the filament at a second point at a controlled linear rate sufficiently in excess of the linear rate of delivery to said first point to stretch the filament to a predetermined orientation, and restraining the movement of the filament, between said first and second points by means of a force of constant value of the magnitude required to produce the necessary tension in the filament for said predetermined orientation, whereby a filament is produced having a uniformly oriented crystalline structure and a cross-sectional area of constant value.

GEORGE A. SPENCER.

REFERENCES CITED

The following references are of record in the file of this patent:

UNITED STATES PATENTS

| Number | Name | Date |
| --- | --- | --- |
| 1,839,212 | Furness | Jan. 5, 1932 |
| 2,118,856 | Moncrieff | May 31, 1938 |
| 2,157,117 | Miles | May 9, 1939 |
| 2,212,772 | Graves | Aug. 27, 1940 |
| 2,214,332 | Kline | Sept. 10, 1940 |
| 2,260,251 | Jannell | Oct. 21, 1941 |
| 2,437,973 | Schmitz | Mar. 16, 1948 |
| 2,442,346 | Eigenberger | June 1, 1948 |